United States Patent
Bevemyr

(10) Patent No.: US 8,913,519 B2
(45) Date of Patent: Dec. 16, 2014

(54) METHOD AND NETWORK MANAGEMENT SYSTEM FOR RECONFIGURING A DATA NETWORK NODE

(71) Applicant: Tail-f Systems AB, Stockholm (SE)

(72) Inventor: Johan Bevemyr, Sollentuna (SE)

(73) Assignee: Tail-f Systems AB, Stockholm (SE)

( * ) Notice: Subject to any disclaimer, the term of this patent is extended or adjusted under 35 U.S.C. 154(b) by 0 days.

(21) Appl. No.: 13/623,797

(22) Filed: Sep. 20, 2012

(65) Prior Publication Data

US 2014/0078930 A1    Mar. 20, 2014

(51) Int. Cl.
*H04L 12/28* (2006.01)
*H04L 12/24* (2006.01)

(52) U.S. Cl.
CPC .................................. *H04L 41/02* (2013.01)
USPC ....................................................... 370/253

(58) Field of Classification Search
USPC .......... 370/241, 252, 254–255; 709/220, 221, 709/223–224
See application file for complete search history.

(56) References Cited

U.S. PATENT DOCUMENTS

| | | | |
|---|---|---|---|
| 6,625,590 B1 * | 9/2003 | Chen et al. ..................... | 709/223 |
| 2012/0197795 A1 * | 8/2012 | Campbell et al. ............... | 705/42 |
| 2013/0073486 A1 * | 3/2013 | Petrick ........................... | 706/12 |

OTHER PUBLICATIONS

Wallin et al, Automating network and service configuration using NETCONF and YANG, USENIX Association, 14 pages, 2011.*

* cited by examiner

*Primary Examiner* — Frank Duong

(57) ABSTRACT

The present invention relates to a method for reconfiguring data network nodes (3, 5, 7) in a data network (1), the method comprising the steps of:
  storing information comprising:
    a first set of data ($25^I$-$25^V$) representing a current configuration of the data network nodes (3, 5, 7), and
    a second set of data ($27^I$-$27^V$) representing a desired configuration of the data network nodes (3, 5, 7);
  generating, from said first set of data ($25^I$-$25^V$) and said second set of data ($27^I$-$27^V$), an information entity (33, $33^I$-$33^V$) representing a difference between said current configuration and said desired configuration, and
  reconfiguring at least one of said data network nodes (3, 5, 7) using said information entity (33, $33^I$-$33^V$).

13 Claims, 10 Drawing Sheets

METHOD AND NETWORK MANAGEMENT SYSTEM FOR RECONFIGURING A DATA NETWORK NODE

TECHNICAL FIELD

The invention relates to the field of data network management systems, and in particular to a method, a computer program and a network management system for reconfiguring data network nodes in a data network.

BACKGROUND

Monitoring and administration of data networks and the separate nodes of the data networks are typically performed by a combination of hardware and software components referred to as a network management system (NMS).

Installation and removal of data network nodes (sometimes referred to as "devices") as well as creation, manipulation or deletion of services in the data network require the NMS to enable reconfiguration of the network nodes.

Monitoring what configuration changes should be made and what configuration changes have been made to the data network nodes of the network is not a trivial task. Nor is it a trivial task to implement the desired configuration of the data network nodes in an efficient manner.

One known way of reconfiguring a network node is to connect and logon to the network node, and to manually enter CLI (command line interface) commands on the integrated command-line interface of the node. However, this process of "locally" reconfiguring network nodes using CLI commands is very time consuming, in particular if the network comprises a large number of network nodes and/or if many configuration parameters are to be changed.

Another and more automated way that allows "remote" reconfiguration of network nodes is to use scripting. However, different nodes speak different languages due to differences in their command-line interfaces. Therefore, the configuration parameters must be embedded in scripts that are individually adapted to the different network nodes in order for the network nodes to understand what configuration changes are to be made. Creating the node-specific scripts, or a script that is interpretable by all nodes of the network, is also a very time consuming process.

There is software for automatic generation of reconfiguration scripts which eliminates the time consuming process of manual scripting. However, such software is developed to support reconfiguration of specific types of network nodes, e.g. a specific router from a specific manufacturer, and cannot be used to generate reconfiguration scripts which are interpretable by all data network nodes normally comprised in larger data networks.

Yet another problem associated with known solutions for reconfiguration of data network nodes is the high amount of data traffic in the network during the reconfiguration process. In some known NMS systems where desired configuration changes of the network nodes are entered into a single database storing the configurations of the network nodes, the configuration changes are implemented by pushing the configuration data in the database to all nodes of the network. In such NMS systems, a network node may be caused to replace its current set of configuration parameters with the set of configuration parameters stored for that node in the database, even if no change has been made to that particular set of configuration parameters since the last time the data of the database was pushed out in the network. The bandwidth requiring data traffic caused by such "redundant reconfiguration" of data network nodes is undesired. Furthermore, it is difficult to keep track of which desired configuration changes have been entered into the database and which are still to be entered before pushing the configuration data out in the network to implement the changes.

Thus, there is a desire to improve both the process of monitoring configuration changes of data network nodes in a data network, and the process of implementing desired configuration changes in the network.

SUMMARY

It is an object of the present invention to eliminate or at least mitigate at least some of the above mentioned problems relating to monitoring and reconfiguration of data network nodes in a data network.

This is achieved by a method for reconfiguring data network nodes in a data network, comprising the steps of storing a first set of data representing a current configuration of the data network nodes, and a second set of data representing a desired configuration of the data network nodes. The method further comprises the steps of generating, from said first and said second sets of data, an information entity representing a difference between said current configuration and said desired configuration, and reconfiguring at least one of said data network nodes using said information entity.

The information entity representing the difference between the current configuration and the desired configuration will hereinafter be referred to as "the Diff". By storing a first data set representing the current configurations of the network nodes and a second data set representing the desired configurations of the data network nodes, and generating a Diff representing the difference therebetween, it becomes easy to see which desired configuration changes have been prepared for and which configuration changes are yet to be prepared for before actually implementing the changes in the network.

Furthermore, by generating a Diff that only contains configuration information that has been changed, and using the Diff in the reconfiguration process, the risk of redundant reconfiguration of network nodes is eliminated.

Preferably, the method further comprises the steps of storing a data model which together with the first and second sets of data provides data structure representations of the current and desired configurations of the data network nodes, and using this data model in the generation of the Diff.

The data model is used to describe the first and second sets of data in the context of the data network, i.e. to relate the stored configuration data to the different data network nodes and their different types of configuration parameters. The data model allows the first and second sets of data to be divided into text entities describing the current and desired configurations of the data network nodes in plain text, and metadata entities describing these texts in the context of the data model. Thereby, the Diff can be generated based on both a strict text-based comparison between text describing the current configuration of the data network nodes and text describing the desired configuration of the data network nodes, and a comparison of metadata describing the contexts of text lines currently being compared. The comparison of metadata makes it possible to identify desired configuration changes that would have been difficult or even impossible to detect using a strict text-based comparison, and so makes it possible to generate a Diff that truly represents the difference between the current and desired configurations of the data network nodes.

Thus, the method preferably comprises the steps of generating, from said first and second sets of data and said data model, text entities describing the current and desired configurations of the data network nodes in plain text, and metadata entities associated with said text entities and relating the text of the text entities to said data model. The text entities and the metadata entities are then used in the generation of the Diff.

Preferably, this is performed by first generating: a first text entity describing the current configuration of the data network nodes in plain text; a second text entity describing the desired configuration of the data network nodes in plain text; a first metadata entity associated with said first text entity and relating the text of the first text entity to the data model, and a second metadata entity associated with said second text entity and relating the text of the second text entity to the data model. Then the first text entity is compared with the second text entity, and the first metadata entity is compared with the second metadata entity. This allows the Diff to be generated by comparing the lines of the first text entity with the lines of the second text entity while keeping track of the current context by comparing corresponding lines of the first and second metadata entities with each other.

The Diff is preferably generated in form of CLI command sequences that may be directly transmitted to a data network node in order to reconfigure the node, without further processing. In order to generate the Diff in form of CLI command sequences that are interpretable by the command-line interfaces of the data network nodes, the above mentioned data model preferably comprises at least a first set of annotations serving as instructions on how to map the configuration data of the first and second data sets into text-based CLI command sequences. These "data-to-text mapping annotations" are preferably used to first map the first and second sets of data into CLI command sequences forming the above mentioned first and second text entities. The Diff is then generated as CLI command sequences based on the difference between the CLI command sequences of the first and second text entities, and the difference between the metadata entities associated with the respective text entity, as described above.

Preferably, the data model further comprises a second set of annotations indicative of how to parse text in form of CLI command sequences into data. These "text-to-data parsing annotations" may be used to properly convert CLI command sequences, retrieved from the data network nodes and indicating the current configuration of the network nodes, into data. The data resulting from the conversion of the retrieved CLI command sequences is then stored as said first set of data representing the current configuration of the data network nodes.

According to another aspect of the invention, a network management system (NMS) for reconfiguring data network nodes in a data network is provided. The NMS comprises various components that will be described in the detailed description following hereinafter, which components are configured to cause the NMS to automatically carry out the steps of the above described method.

The main components of the NMS are:
- a first database, herein referred to as the Running database, storing the first set of data representing the current configuration of the data network nodes;
- a second database, herein referred to as the Candidate database, storing the second set of data representing the desired configuration of the data network nodes, and
- a controller, constituting what is sometimes referred to as a NED (Network Element Driver), configured to generate the Diff from the first and second sets of data, and to use the Diff to reconfigure the at least one data network node that is to be reconfigured.

The controller is typically implemented as a combination of hardware and software and so comprises at least a digital storage medium for storing a computer program, and a processing unit for executing the computer program. The computer program comprises computer-readable code which when executed by the processing unit causes the controller to carry out the steps of the method.

BRIEF DESCRIPTION OF THE DRAWINGS

The above and other features and advantages of the present invention will become readily apparent to those skilled in the art by the following detailed description of exemplary embodiments thereof with reference to the accompanying drawings, wherein.

DETAILED DESCRIPTION

Figure 1:
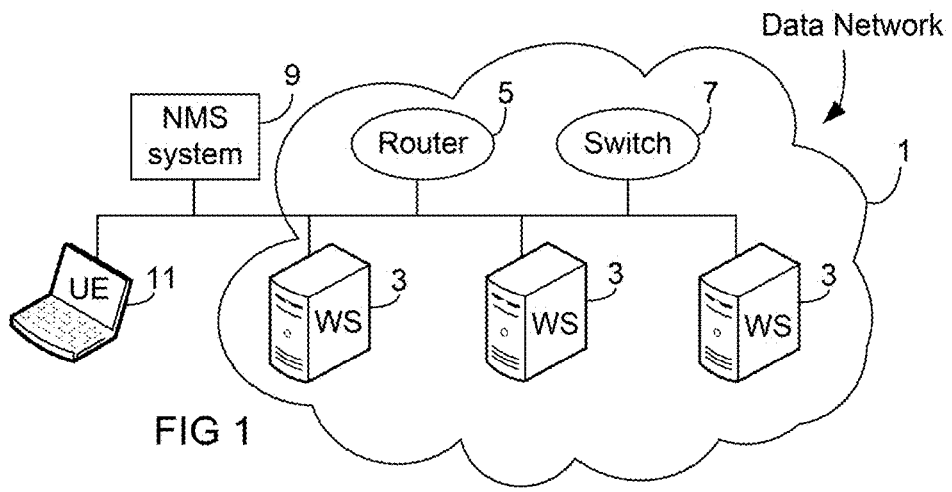
FIG. 1 schematically illustrates an example of a data network and a network management system according to the invention.

The figures are schematic and simplified for clarity reasons, and they merely show details which are essential to the understanding of the invention, while other details have been left out. Throughout the following description, the same reference numerals are used for identical or corresponding parts or steps.

FIG. 1 illustrates schematically a data network 1 in which the present invention may be implemented. The data network 1 comprises a set of data network nodes 3, 5, 7, which in this exemplary embodiment comprises a plurality of web servers 3, a router 5, and a switch 7. A data network node may in the context of this application be any hardware or software component connectable to a data network, including but not limited to web servers, radio base stations, switching devices, routers and gateways.

Installation and removal of network nodes, as well as creation, manipulation or deletion of services in the data network 1 require reconfiguration of the network nodes, meaning that configuration parameters of the respective network nodes have to be added, modified or deleted. To this end, a network monitoring system (NMS) 9 according to the invention is connected to the data network 1 for monitoring and reconfiguring the set of data network nodes 3, 5, 7 in the data network 1. Although the NMS system 9 in this exemplary embodiment is realized in form of a single NMS node, sometimes referred to as a network configuration system (NCS) server, it should be appreciated that the NMS system 9 could also be a distributed system including functionality residing in different nodes that are connectable to each other via the data network 1 or some other network.

Also shown in FIG. 1 is a piece of user equipment 11, such as a computer, which is connectable to the NMS system 9 to give a network operator the possibility to monitor and reconfigure the network nodes 3, 5, 7 of the data network 1 using the functionalities provided by the NMS system 9.

Figure 2:
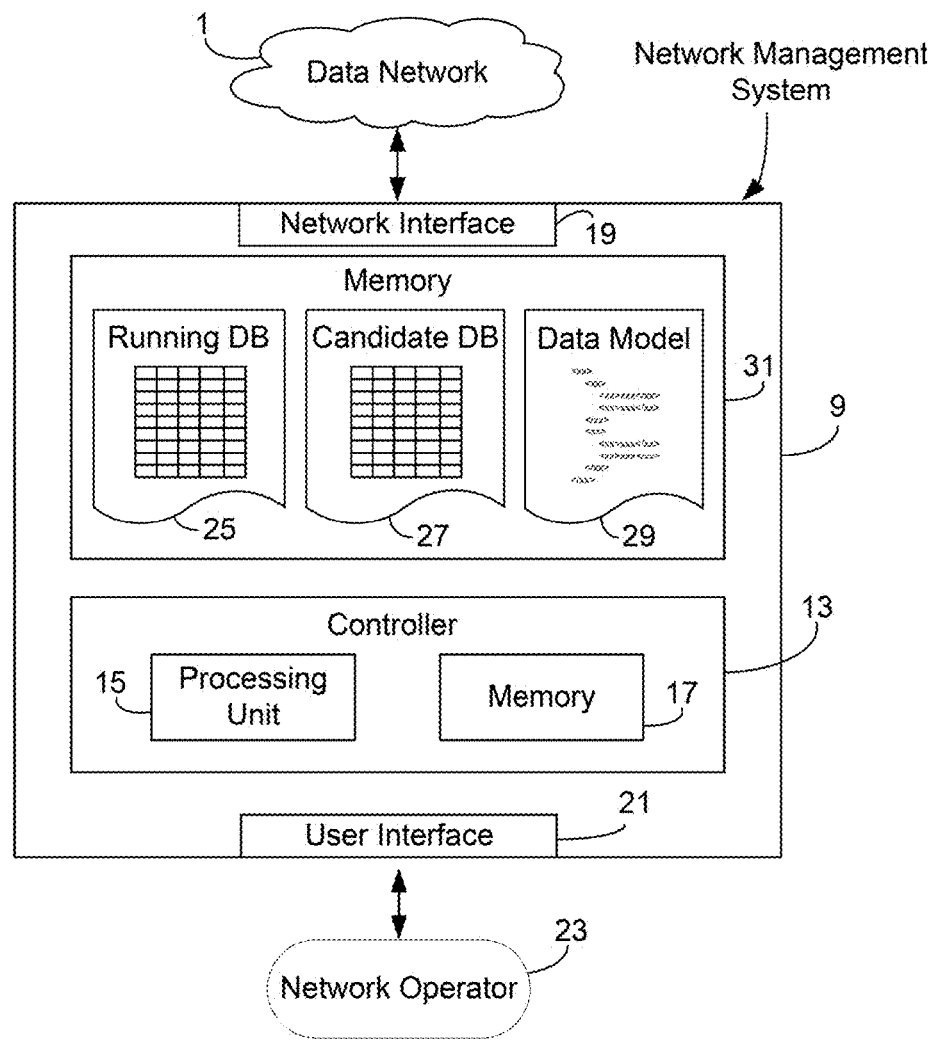
FIG. 2 illustrates the network management system of FIG. 1 in greater detail.

With simultaneous reference made to FIG. 1, the NMS system 9 will now be described with reference to FIG. 2.

The NMS system 9 comprises a controller 13 that includes a processing unit 15, such as a microprocessor, and a digital storage medium or memory 17. The memory 17 stores a computer program which, when executed by the processing unit 15, causes the controller 13 to perform the inventive method of monitoring and/or reconfiguring data network nodes 3, 5, 7 in a data network 1, which method will be described in greater detail below.

The NMS system further comprises a network interface 19 for communication with the data network nodes 3, 5, 7 of the data network 1, and a user interface 21 for communication with user equipment 11 of a network operator 23. The network interface 19 is configured to transmit information, such as reconfiguration commands, to the network nodes 3, 5, 7 of the data network 1, and to receive information, such as configuration status reports, from the data network nodes. The user interface 21 is configured to transmit information, e.g. information on the current configuration of data network nodes, to user equipment 11 of a network operator 23, and to receive information from the user equipment 11 of the network operator 23, e.g. information on desired changes to the configuration of data network nodes, and commands instructing the NMS system 9 to implement the desired configuration changes in the data network 1.

The NMS system further comprises a first database 25 for storing information representing the current configuration of the data network nodes 3, 5, 7. This database is herein referred to as the Running database. The Running database 25 is synchronized with the network 1 so as to always reflect the current configuration of the network nodes 3, 5, 7. Synchronization of the Running database 25 may be performed automatically by the controller 13 of the NMS system. The NMS system is preferably configured to receive text-based configuration status reports, typically in form of CLI command sequences, from the network nodes 3, 5, 7 via the network interface 19, which configuration status reports are indicative of the current configuration of the network nodes 3, 5, 7. The controller 13 may be configured to update the Running database 25 automatically based on the received configuration status reports, so as to always keep the Running database 25 up to date. In other embodiments, synchronization of the Running database 25 with the current configuration of the data network 1 can be made manually by the network operator 23 by updating the Running database 25 via the user interface 21 whenever the configuration of a data network node 3, 5, 7 is changed. As will be understood from the following description, the Running database 25 may also be kept up to date by copying the content of a second database 27 into the Running database 25 after having implemented the desired configuration changes in the data network 1.

The NMS system 9 thus further comprises a second database 27. This database is used for storing a desired future configuration of the data network nodes 3, 5, 7 and is herein referred to as the Candidate database.

When changes in configuration of one or more data network nodes 3, 5, 7 are desired, i.e. addition, modification and/or deletion of one or more configuration parameters, the desired changes are not directly entered into the Running database 25 since the Running database 25 should always reflect the actual configuration of the data network nodes 3, 5, 7 running in the data network 1. Instead, desired changes in configuration of network nodes are entered in the Candidate database 27.

The content of the Candidate database 27 is first created by copying the content of the Running database 25, i.e. the configuration parameters of the current configuration of the network nodes 3, 5, 7, into the Candidate database 27. Desired configuration changes are then entered in the Candidate database 27. When it is time to implement the desired changes in the data network 1, a network operator 23 gives an implementation command to the NMS system 9 whereupon an automatic reconfiguration process which will be described in detail hereinafter is initiated. From the above it should be appreciated that the data of the Candidate database 27 is identical to the data of the Running database 25 except for the additions, modifications and/or deletions of data in the Candidate database 25 corresponding to the desired configuration changes of the data network nodes 3, 5, 7 of the data network 1.

The desired configuration changes may be entered into the Candidate database 26 either manually by network operators 23, or automatically or semi-automatically by means of software, such as computer programs tailored for operations support systems (OSS) or business support systems (BSS).

Furthermore, the NMS system 9 comprises a data model 29 of the data network 1, which data model models the data network nodes 3, 5, 7 of the network and their possible configurations. The data model 29 is preferably created in a modelling language conforming to a tree structure, such as an XML-like modelling language, wherein different leafs of the tree-structured data model define different configuration parameters of the data network nodes 3, 5, 7 of the data network 1. In a preferred embodiment, the data model 29 is modelled in YANG (RFC 6020), which is a data modeling language used to model configuration and state data manipulated by the NETCONF protocol. In this exemplary embodiment, the Running database 25, the candidate database 27, and the data model 29 are stored in a second digital storage medium or memory 31 of the NMS system 9. Of course, the various software components of the NMS system 9 could be stored in one or more storage mediums in one or more nodes of the NMS system 9.

It should be appreciated thus that the data model 29 serves to describe the configuration data in the Running and Candidate databases 25, 27 in the context of the data network 1 and its network nodes 3, 5, 7, whereas the Running database 27 and the Candidate database 27 only store data representing the current and desired configuration parameters, respectively, of the data network nodes 3, 5, 7.

Figure 3:
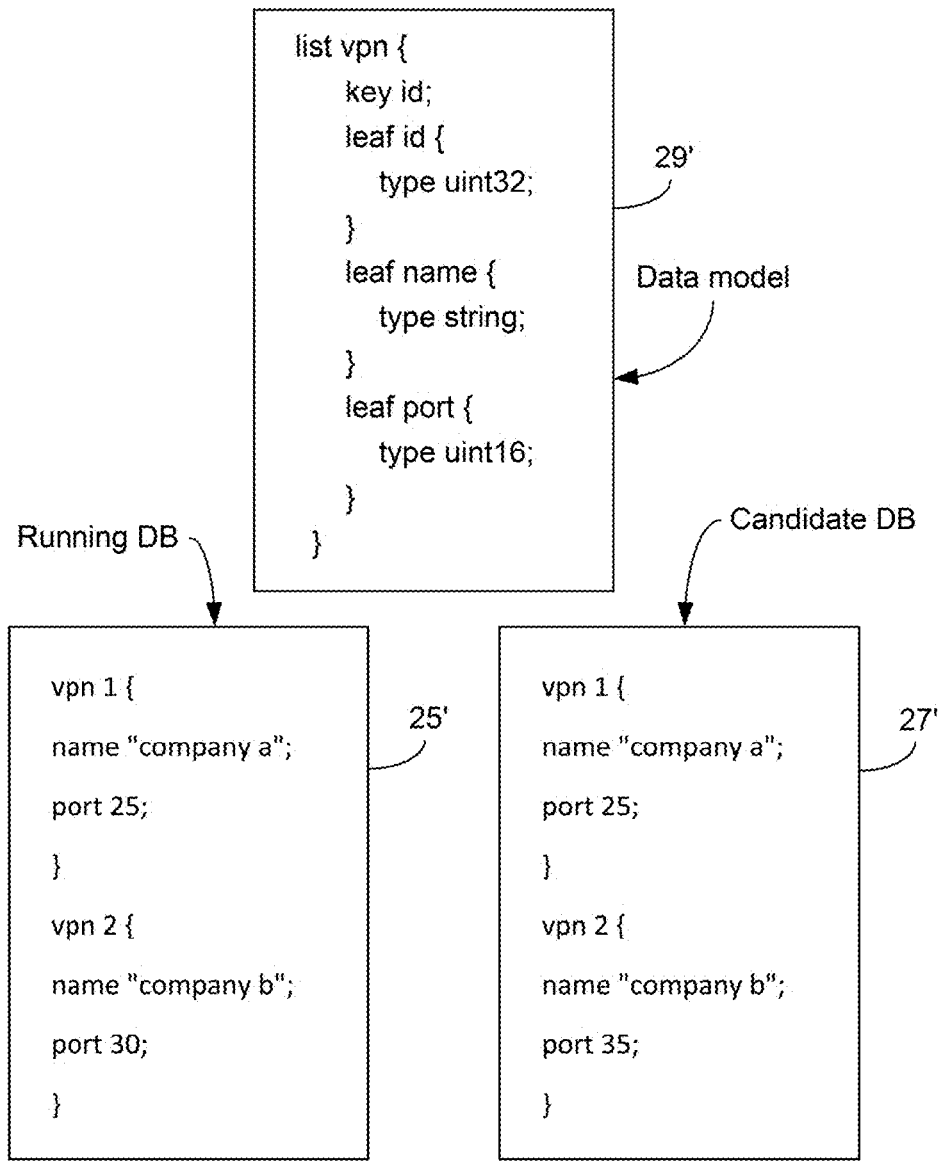
FIG. 3 illustrates examples of contents of a data model, a first database, and a second database of the network management system according to the invention, FIG. 4 schematically illustrates the process of generating an information entity (the Diff) representing the difference between a current configuration of data network nodes and a desired configuration of the data network nodes, according to an exemplary embodiment of the invention.

As a way of illustration, FIG. 3 shows some exemplary code 29' of the data model 29, which exemplary code 29' defines the types of configuration parameters that can be assigned to a data network node of the data network 1 to define a VPN (Virtual Private Network) connection for that data network node. Also shown in FIG. 3 is an exemplary data set 25' stored in the Running database 25 and representing a current VPN configuration of a data network node in the data network 1, and an exemplary data set 27' stored in the Candidate database 27 and representing a desired future VPN configuration of the data network node.

The data 25' in the Running database 25 together with the data model 29 form a data structure representation of the current configurations of the data network nodes 3, 5, 7. In a corresponding manner, the data 27' in the Candidate database 27 together with the data model 29 form a data structure representation of the desired configurations of the data network nodes 3, 5, 7.

When the network operator 23 gives a command to implement the desired configuration changes in the data network 1, the controller 13 compares the data 25' in the Running database 25 with the data 27' in the Candidate database 27 to generate an information entity, herein referred to as the Diff, indicative of the difference between the contents of the Running database 25 and the Candidate database 27, and so representing the difference between the current configurations of the data network nodes 3, 5, 7 and the desired configurations of the data network nodes 3, 5, 7. The controller 13 then uses this information entity, or Diff, to reconfigure the data network nodes 3, 5, 7 as will be described in greater detail below.

The controller 13 does not generate the Diff through a direct comparison between the data in the Running database 25 and the data in the Candidate database 27. Instead, the controller 13 is configured to generate, using the data in the Running database 25, the data in the Candidate database 27, and the data model 29:
- a text-based representation of the current configuration of the network nodes 3, 5, 7;
- a text-based representation of the desired configuration of the network nodes 3, 5, 7;
- a first piece of metadata, or context data, relating said text-based representation of the current configuration to the data model 29, and
- a second piece of metadata, or context data, relating said text-based representation of the desired configuration to the data model 29, and to generate the Diff based on a comparison between the two text-based representations, and a comparison between the two pieces of metadata.

The text-based representations of the current and desired configurations are text entities, typically two text files, listing the current and desired configuration parameters, respectively, of the network nodes 3, 5, 7 in plain text. The pieces of metadata are metadata entities, typically two metadata-containing files, each associated with one of said text entities. The metadata entities comprise a plurality of lines, each comprising metadata relating a corresponding line in the associated text entity to the context of the data model 29.

Figure 4:
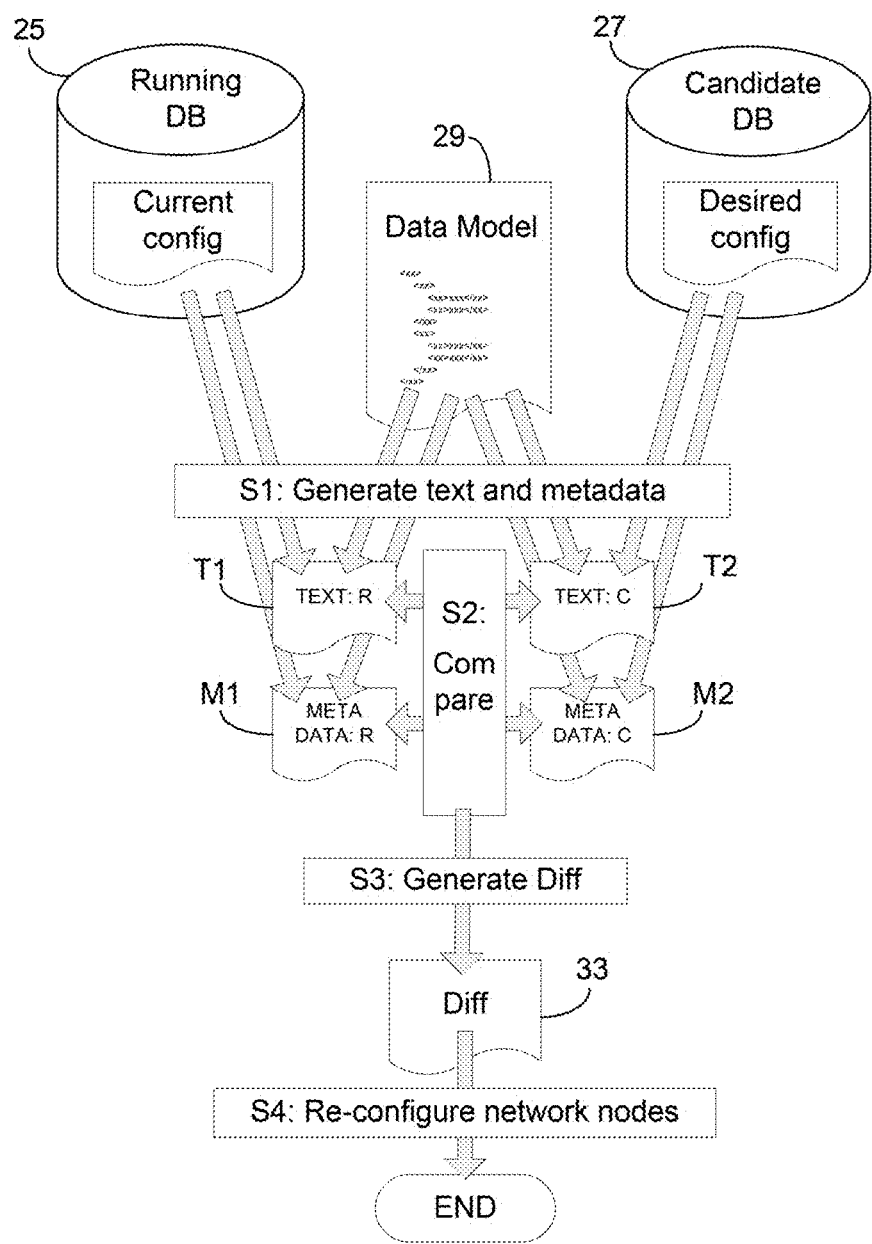

FIG. 4 illustrates this process of generating the Diff from the Running database 25, the Candidate database 27, and the data model 29.

As shown in FIG. 4, a first text entity T1 describing the current configuration parameters of the data network nodes in plain text is generated using the data in the Running database 25 and the data model 29. Furthermore, an associated first metadata entity M1 is generated using the data in the Running database 25 and the data model 29, which entity comprises metadata that describes the text of the first text entity T1 in the context of the data model 29. Likewise, a second text entity T2 describing the desired configuration parameters of the data network nodes in plain text is generated using the data in the Candidate database 27 and the data model 29. Also, an associated second metadata entity M2 is generated using the data in the Running database 25 and the data model 29, which entity comprises metadata that describes the text of the second text entity T2 in the context of the data model 29. These information entities T1, T2, M1, M2 are generated in a first step denoted S1.

In a second step S2, the first text entity T1 is compared with the second text entity T2, and the first metadata entity M1 is compared with the second metadata entity M2. The comparisons are performed on a line-by-line basis, meaning that the comparisons are made in the following order: 1) the first line in the first text entity T1 is compared with the first line in the second text entity T2; 2) the first line in the first metadata entity M1 is compared with the first line in the second metadata entity M2; 3) the second line in the first text entity T1 is compared with the second line in the second text entity T2; 4) the second line in the second metadata entity M1 is compared with the second line in the second metadata entity M2, and so on. In some cases the lines of the metadata entities M1 and M2 do not have to be compared if their corresponding text lines in the associated text entities T1 and T2 do not differ from each other.

In a third step S3, a Diff 33 representing the difference between the current and desired configurations of the network nodes 3, 5, 7 is generated based on the comparisons performed in step S2. Typically, the Diff 33 is not generated after the comparisons but gradually built up during the comparisons, as will also be discussed in further detail below.

The Diff 33 resulting from said comparisons is a text-based information entity comprising CLI command sequences. These CLI command sequences are instructions telling a data network node 3, 5, 7 of the data network 1 how to change its current configuration (as indicated in the Running database 25) to the desired configuration (as indicated in the Candidate database 27).

In a last step S5, the Diff 33 is used to reconfigure the data network nodes 3, 5, 7 of the data network 1. This is typically achieved by transmitting the CLI command sequences from the NMS system 9 to the network node or nodes 3, 5, 7 that are to be reconfigured via the network interface 19 (FIG. 2). Since the CLI command sequences are generated based on the difference between the data in the Running database 25 and the data in Candidate database 27, the CLI command sequences only contain CLI commands for the data network nodes 3, 5, 7 the configuration of which have been changed, i.e. for the data network nodes 3, 5, 7 that are to be reconfigured.

In a preferred embodiment, the data model 29 comprises annotations instructing the controller 13 how to generate CLI commands for the data network nodes 3, 5, 7 of the data network 1. As described in greater detail below, these annotations are used by the controller 9 when generating the Diff 33 from the comparisons between the text entities T1, T2 and the metadata entities M1, M2 in step S3, in order to generate the Diff 33 in form of proper CLI command sequences.

Figure 5:
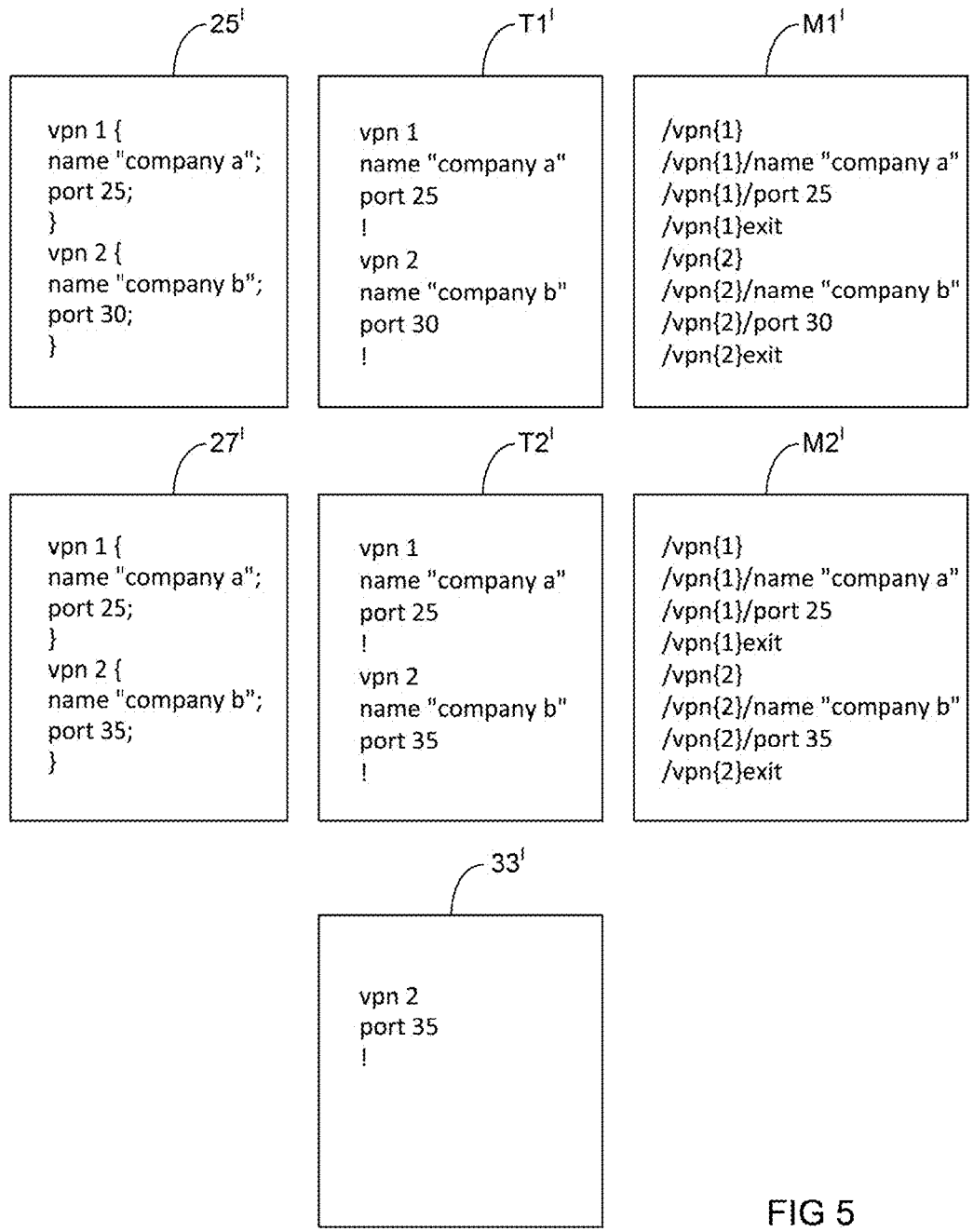
FIGS. 5 to 9 illustrate the generation of the Diff for different desired configuration changes of a data network node.

FIG. 5 illustrates a basic example showing the resulting text entities T1$^I$, T2$^I$, the resulting metadata entities M1$^I$, M2$^I$, and the resulting Diff 33$^I$ when starting from the exemplary code 29$^I$ of the data model 29, the exemplary data set 25$^I$ of the Running database 25, and the exemplary data set 27$^I$ of the Candidate database 27, illustrated in FIG. 3.

The process of generating the Diff 33$^I$ can be described as follows:

As is clear from a comparison between the data sets 25$^I$ and 27$^I$, the only difference between the data in the Running database 25 and the Candidate database 27 is that the data 25$^I$ in the Running database 25 indicates that the VPN connection with id "2" uses port 30 while the data 27$^I$ in the Candidate database 27 indicates that this VPN connection should be reconfigured to use port 30. This means that the only desired configuration change of this particular (undefined) data network node is to change port from port 30 to port 35 for the VPN connection "vpn 2".

As seen in FIG. 5, the resulting Diff 33$^I$ becomes:

```
vpn 2
port 35
!
```

The diff process has at least the following states:
current_context
which is the context of lines currently being compared, and
cursor
which is the context of the last line being added to output, i.e. to the Diff 33.

Initially both states current_context and cursor are " ".

The Diff $33^I$ is calculated by comparing each line of the text entity $T1^I$ with each line of the text entity $T2^I$ while keeping track of the current context using the metadata entities $M1^I$ and $M2^I$. After the first line the current_context becomes /vpn{1} which it remains until the "!" line, where the current_context becomes " ". At "vpn 2" the current_context becomes /vpn{2} which it remains until the second "!". Contexts represent submodes when the data model 29 is rendered as a Cisco style (command based) CLI.

When the diff algorithm used by the controller 13 in the diff process encounters a line in $T2^I$ that differs from the corresponding line in $T1^I$, it adds the line to the Diff $33^I$. But before doing so, it may have to emit reposition commands. These commands bring the cursor to the current state. In this case the cursor is " " and the current_context is /vpn{2}. The commands to move the cursor to /vpn{2} is "vpn 2".

The lines that are written to the Diff $33^I$ are thus:

```
vpn 2
  port 35
```

The remaining line does not differ and is not emitted.

When the text entities $T1^I$ and $T2^I$ have been traversed by the diff algorithm, a command is added to the Diff $33^I$ to move the cursor to " ". In this case from /vpn{2} to " ". Thus, the line is added to the Diff $33^I$.

Figure 6:
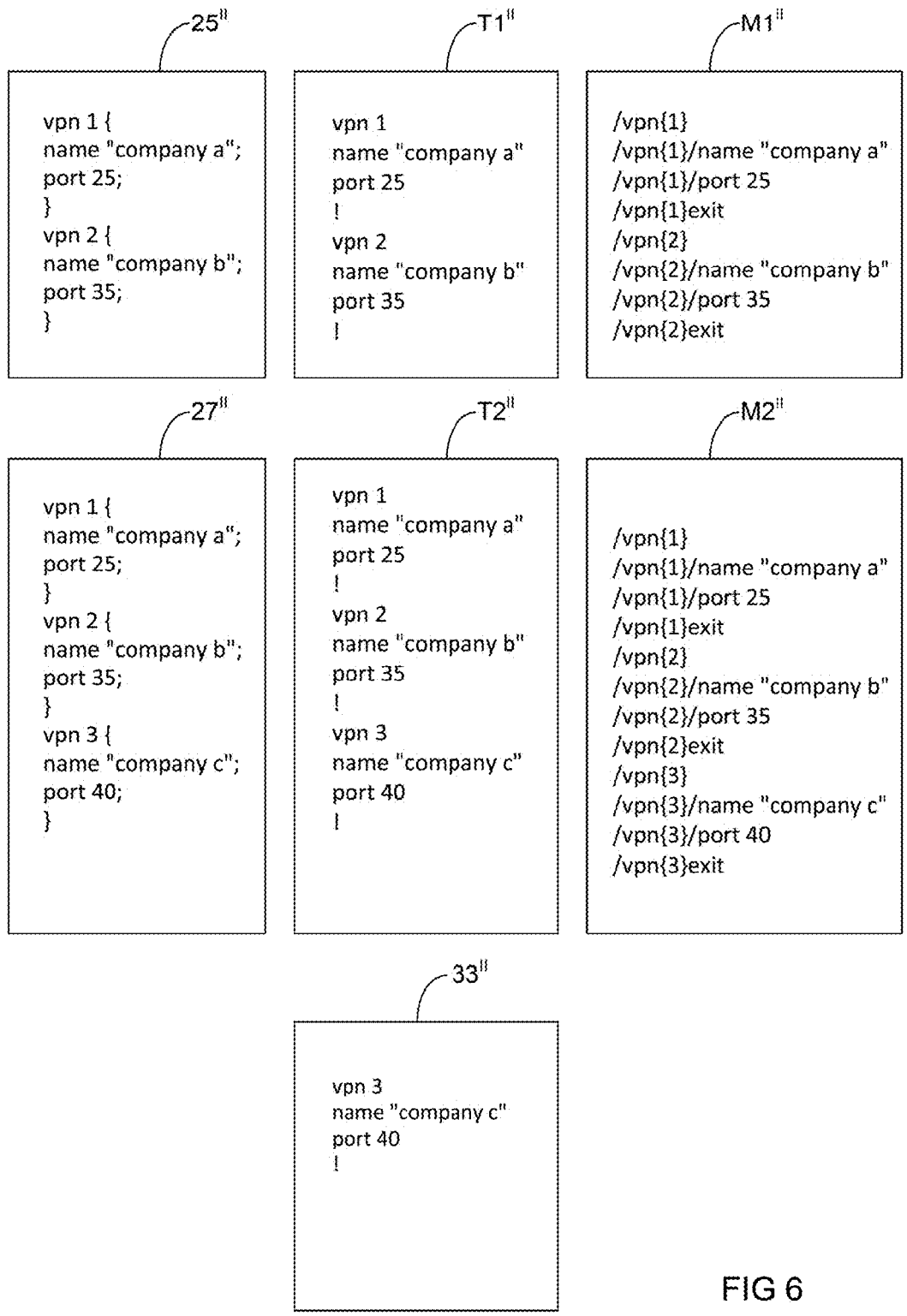

FIG. 6 illustrates another example of a diff process. Here, a Diff $33^I$ is generated from another exemplary data set $25^{II}$ of the Running database 25, and another exemplary data set $27^{II}$ of the Candidate database 27. The data model 29 and its exemplary code $29^I$ are the same as in the previous example.

The process of generating the Diff $33^{II}$ can be described as follows:

The diff function will find all initial lines of the text entities $T1^{II}$ and $T2^{II}$ equivalent and that the text entity T2" has the additional lines:

```
vpn 3
  name "company c"
  port 40
!
```

Current_context and cursor are both " " so no reposition commands are necessary and the additional lines of the text entity $T2^{II}$ generated from the data set $27^{II}$ in the Candidate database 27 are simply added to the output, i.e. to the Diff $33^{II}$.

Figure 7:
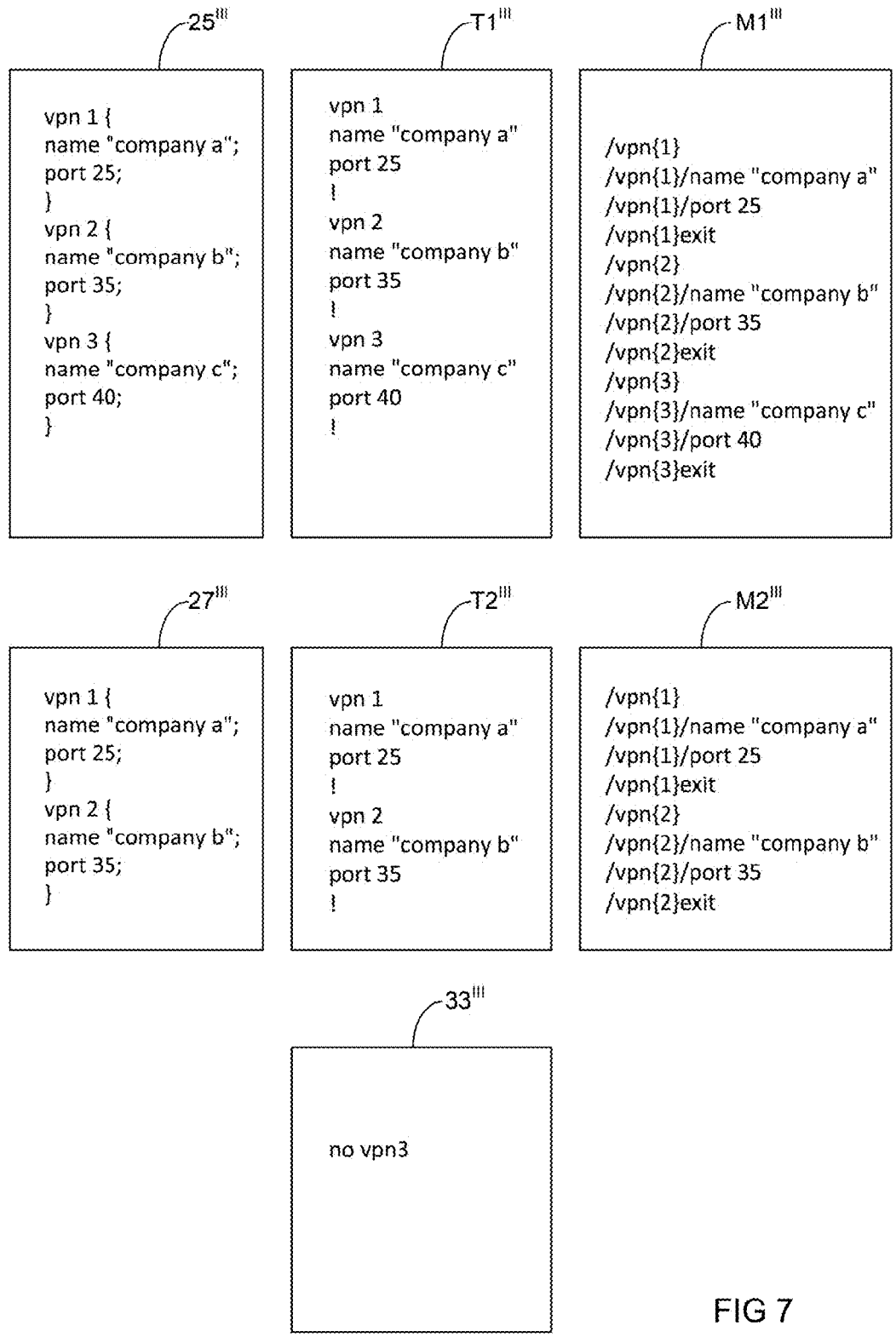

FIG. 7 illustrates yet another example of a diff process. Here, a Diff $33^{III}$ is generated from another exemplary data set $25^{III}$ of the Running database 25, and another exemplary data set $27^{III}$ of the Candidate database 27. The data model 29 and its exemplary code $29^I$ are the same as in the previous examples.

The process of generating the Diff $33^{III}$ can be described as follows:

Upon comparison of the text entities $T1^{III}$ and $T2^{III}$, the diff function will encounter a line "vpn 3" in the text entity $T1^{III}$ generated from the Running database 25, which line is not present in the text entity $T2^{III}$ generated from the Candidate database 27. The current_context and the cursor are both " ". Now a third state, a delete context (delete_context), has to be introduced. The "vpn 3" needs to be removed and the command no vpn 3 is added to the output, i.e. to the Diff $33^{III}$. However, no lines from the text entity $T1^{III}$ should be added to the Diff $33^{III}$ until all lines in the "/vpn{3} context" (or subcontext) have been skipped. The delete_context is set to /vpn{3} and all lines with meta information prefixed with /vpn{3} will be skipped, meaning that all lines in the text entity $T1^{III}$ where the corresponding line in the associated metadata entity $M1^{III}$ starts with /vpn{3} will be ignored. The delete_context is reset as soon as a line without the meta information /vpn{3} is found.

Figure 8:
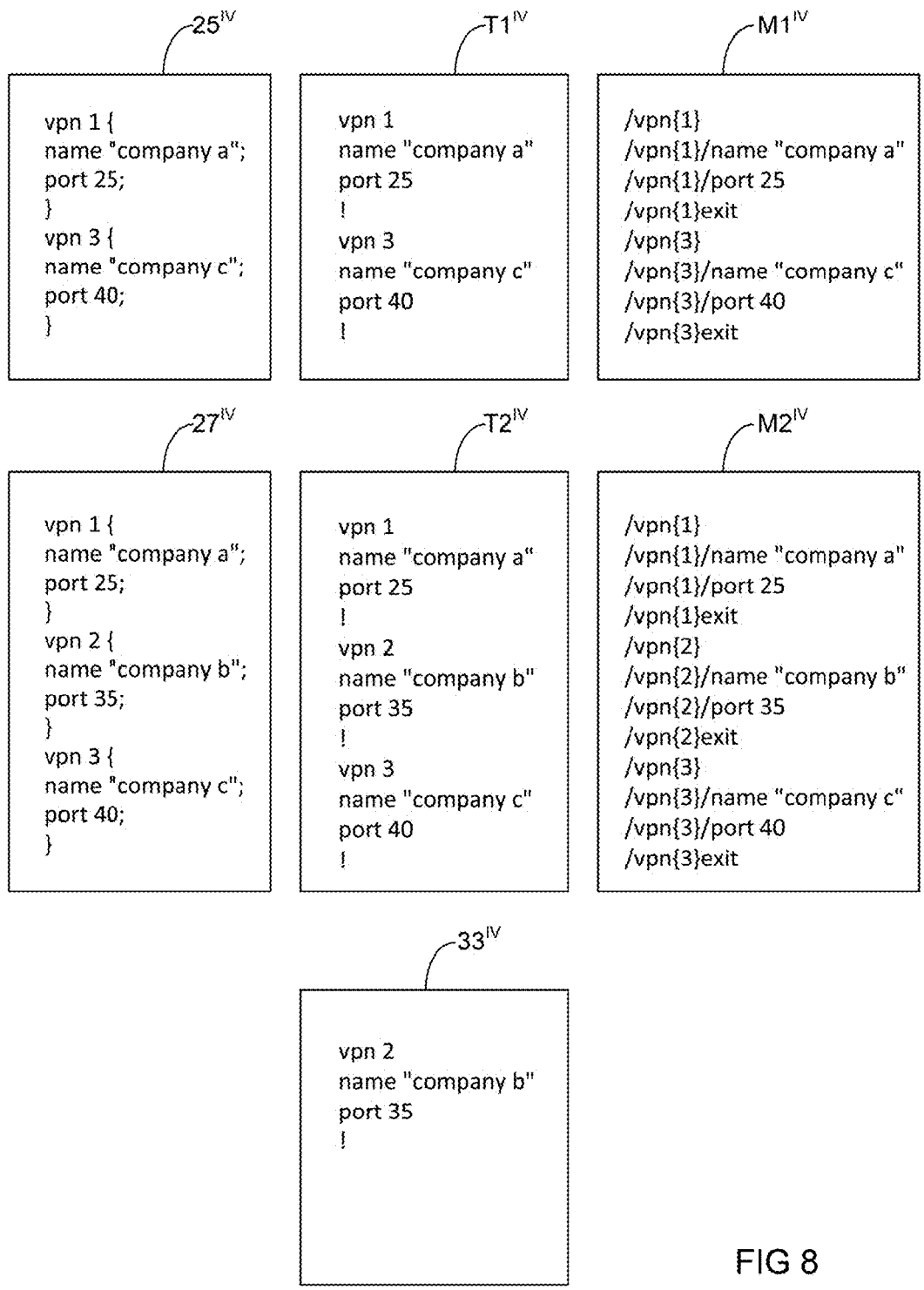

FIG. 8 illustrates yet another example of a diff process. Here, a Diff $33^{IV}$ is generated from another exemplary data set $25^{IV}$ of the Running database 25, and another exemplary data set $27^{IV}$ of the Candidate database 27. The data model 29 and its exemplary code $29^I$ are the same as in the previous examples.

The process of generating the Diff $33^{IV}$ can be described as follows:

As is clear from a comparison between the data sets $25^{IV}$ and $27^{IV}$, the only difference between the Running database 25 and the Candidate database 27 is that the "vpn2 context" has been added to the Candidate database 27.

The diff algorithm will skip all equivalent lines until it reaches the line vpn3 of the text entity $T1^{IV}$, which is compared with the line vpn2 of the text entity $T2^{IV}$. At this point, the metadata of the corresponding lines in the associated metadata entities $M^{IV}$ and $M2^{IV}$ are compared, meaning that the diff algorithm compares the line /vpn 3 of the metadata entity $M1^{IV}$ with the line

/vpn{2} of the metadata entity $M2^{IV}$.

The diff algorithm determines that 2<3 and can deduce that the "vpn2 context", i.e. all configuration information associated with metadata prefixed with /vpn{2}, must be new and currently not implemented in the data network 1 as it is not present in the Running database 25. Consequently, all the "vpn 2" lines are added to the Diff $33^{IV}$. This analysis relies on the fact that the vpn contexts are emitted in a sorted order and, therefore, if the "vpn2 context" was present also in the Running database 25, it would have been found by the diff algorithm before running into the "vpn3 context" in the text entity $T1^{IV}$.

Figure 9:
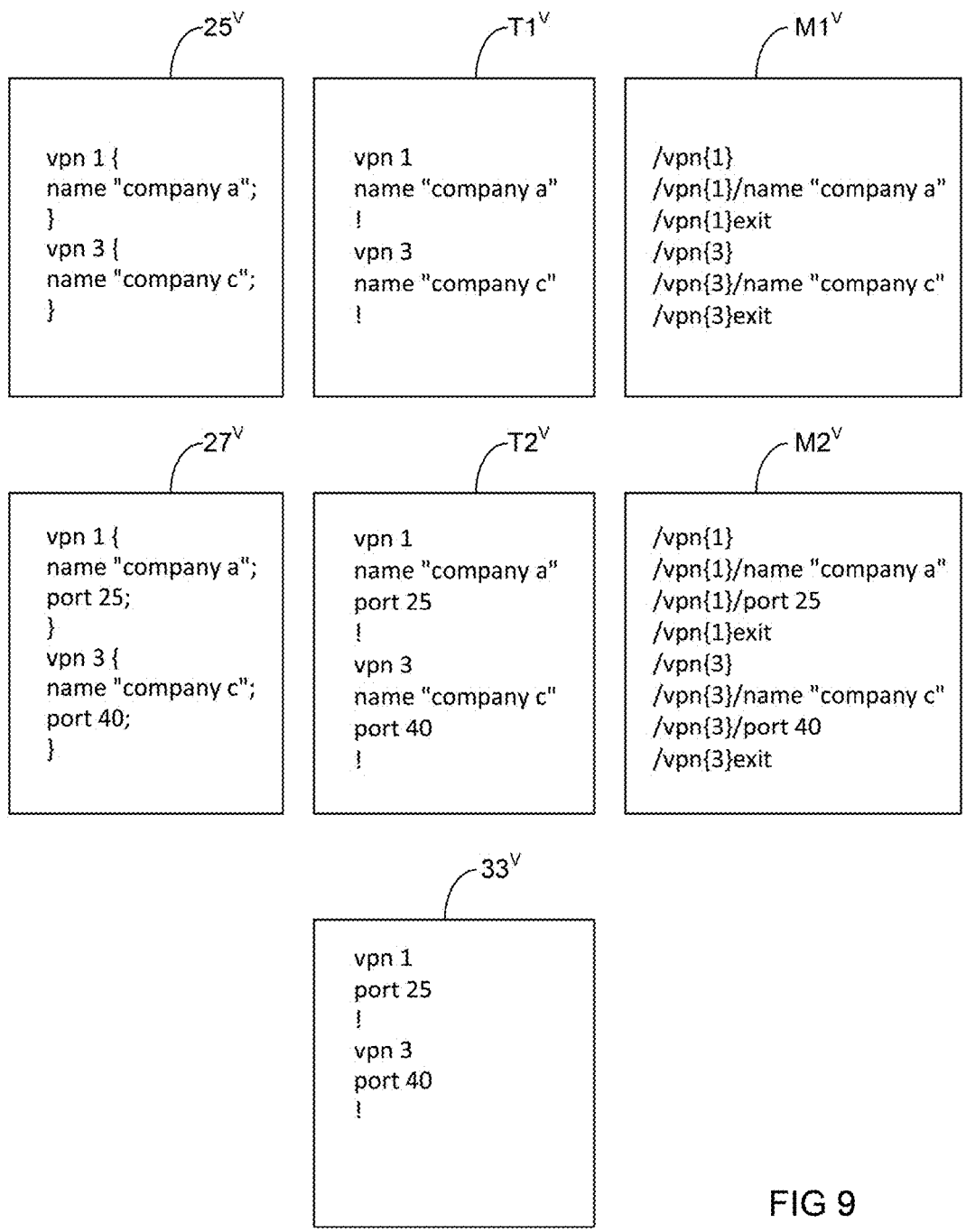

FIG. 9 illustrates yet another example of a diff process. Here, a Diff $33^V$ is generated from another exemplary data set $25^V$ of the Running database 25, and another exemplary data set $27^V$ of the Candidate database 27. The data model 29 and its exemplary code $29^I$ are the same as in the previous examples.

The process of generating the Diff $33^V$ can be described as follows:

As is clear from a comparison between the data sets $25^V$ and $27^V$, the difference between the Running database 25 and the Candidate database 27 is that ports have been set for the vpn connections "vpn 1" and "vpn 3" in the Candidate database 27.

In this case the diff algorithm will skip all equal lines in $T1^V$ and $T2^V$ until it reaches the lines "! " in $T1^V$ and "port 25" in $T2^V$. The algorithm can deduce that a port has been added in the Candidate database 27 and that the line "port 25" should be added to the Diff 33$^V$. The cursor is currently " " but the current_context is /vpn{1}. Therefore, the reposition command "vpn 1" is added to the Diff 33$^V$ before adding the command "port 25".

The cursor is now /vpn{1}. The equal lines following the lines "!" in T1$^V$ and "port 25" in T2$^V$ are skipped until the algorithm reaches the lines "!" in T1$^V$ and "port 40" in T2$^V$. Once again the algorithm determines that a port has been added and the command "port 40" is added to the Diff 33". However, the cursor is currently at /vpn{1} while the current_context is /vpn{3}. Therefore, the reposition commands "!" and "vpn 3" are added to the Diff 33$^V$ before the command "port 40" is added.

As mentioned above, the data model 29 preferably comprises annotations that indicate to the controller 13 how to properly map the data in the databases 25, 27 into text (CLI commands). These data-to-text annotations are then used by the controller 13 when generating the text entities T1 and T2 from the Running database 25 and the Candidate database 27, respectively. Preferably, the data model 29 further comprises annotations that indicate to the controller 13 how to perform reverse mapping (parsing) of text (CLI commands) into data. As mentioned above, the configuration data 25'-25$^V$ in the Running database 25 is typically obtained by the NMS system 9 through the reception of text-based (CLI) configuration status reports from the data network nodes 3, 5, 7 in the data network 1. The text-to-data annotations for reverse mapping are used by the controller 13 to automatically parse the received configuration status reports into configuration data to be stored in the Running database 25.

Sometimes the mapping from data to text is not as straight-forward as in the examples above. A common CLI construct is to have commands that take multiple arguments, where each argument corresponds to a leaf in the data model 29. For example, the command:
    group<id:[1-31]><priority:1-255><timeout:1-60>
may have the data model:

```
list group {
    annotation:cli-suppress-mode;
    annotation:cli-compact-syntax;
    annotation:cli-sequence-commands;
    key id;
    leaf id {
        type uint16 {
            range "1..31";
        }
    }
    leaf priority {
        annotation:cli-drop-node-name;
        type uint16 {
            range "1..255";
        }
    }
    leaf timeout {
        annotation:cli-drop-node-name;
        type uint16 {
            range "1..60";
        }
    }
}
```

In this example, the annotations used to instruct the controller 13 how to properly map the data in the databases 25, 27 into text entities T1, T2 in form of interpretable CLI command sequences all start with "annotation:".

Suppose we have an instance in any of the databases 25, 27 as follows:

```
group 1 {
    priority 25;
    timeout 30;
}
```

Default mapping of this data entity into text (a CLI command) would result in the text:

```
group 1
    priority 25
    timeout 30
    !
``` where "group 1" enters the submode "group" for id 1, "priority 25" executes the submode command to set priority to 25, and "timeout 30" executes the submode command to set the timeout to 30.

However, with the proposed annotations the mapping will instead result in the text:
    group 1 25 30

The annotations are used both when reading the configuration from the data network nodes 3, 5, 7 to help map the text into data in the Running database 25, and when translating the data in the databases 25, 27 into the CLI commands forming the text entities T1 and T2. The annotations in the exemplary data model used above are interpreted as:

annotation:cli-suppress-mode: "Do not translate the list construct into CLI submodes". Adding this annotation to the data model 29 gives the following mapping result:

```
group 1
group 1 priority 25
group 1 timeout 30
``` annotation:cli-compact-syntax: "Stack multiple leaves on one command line". Adding this annotation and the annotation:cli-suppress-mode to the data model 29 gives the following mapping result:
    group 1 priority 25 timeout 30 annotation:cli-drop-node-name: "Do not include the node name in the mapping". Adding this annotation to the data model 29 together with the two above annotations gives the following mapping result:
    group 1 25 30 which is a CLI command that the CLI of the data network nodes 3, 5, 7 can understand.

Finally, the annotation annotation:cli-sequence-commands is used when doing the reverse mapping (parsing), i.e. when going from text to data. It tells the parser of the NMS system 9 that the leaves must be given in the same order as they are listed in the database. Without this annotation the parser does not know if the command "group 1 25 30" should be parsed into:

```
group 1 {
    priority 25;
    timeout 30;
}
group 1 {
    priority 30;
    timeout 25;
}
```

It should be appreciated that the above data model and the annotations used therein are merely examples intended to illustrate the advantage of using annotations in the data model. In a data model covering all possible configurations of all data network nodes 3, 5, 7 in the data network 1, much more annotations may have to be used to handle situations where "default mapping" would not properly translate the data into CLI commands and vice versa.

With simultaneous reference made to the previous drawings and the reference numerals used therein, embodiments of a method for reconfiguring data network nodes 3, 5, 7 in a data network 1 will now be described with reference to FIGS. 10 to 12.

Figure 10:
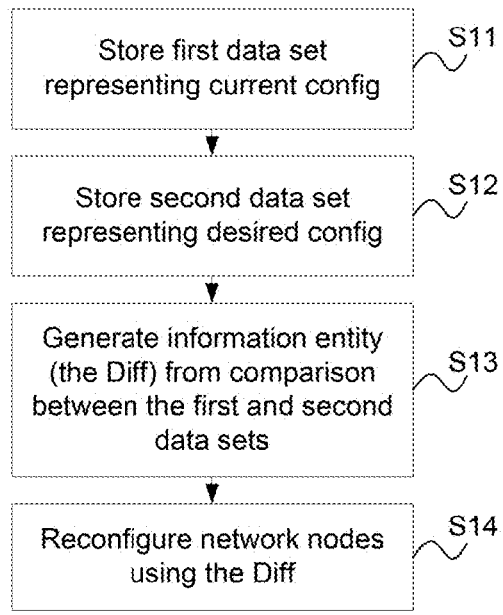
FIGS. 10 to 12 are flowcharts illustrating different aspects of a method for reconfiguring data network nodes in a data network according to embodiments of the invention.

FIG. 10 illustrates a first embodiment of a method for reconfiguring data network nodes 3, 5, 7 in a data network 1.

In a first step, S11, a first data set $25^I$-$25^V$ representing the current configuration of the data network nodes 3, 5, 7 is stored in the Running database 25.

In a second step, S12, a second data set $27^I$-$27^V$ representing the desired configuration of the data network nodes 3, 5, 7 is stored in the Candidate database 27.

In a third step, S13, an information entity $33^I$-$33^V$ (the Diff) representing the difference between the current configuration and the desired configuration is generated based on a comparison between the first data set and the second data set.

In a fourth and final step, S14, one or more data network nodes 3, 5, 7 are reconfigured using said information entity $33^I$-$33^V$.

Figure 11:
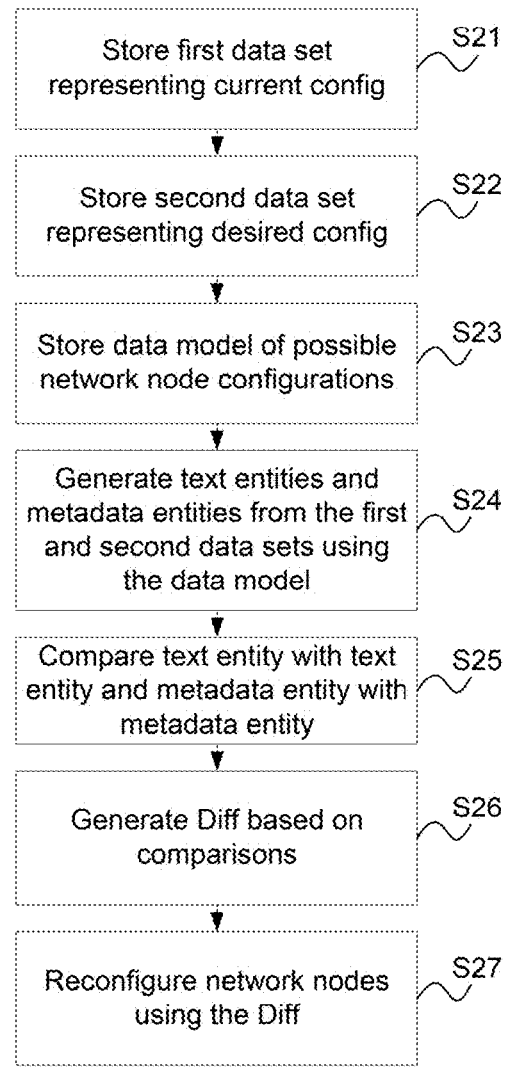

FIG. 11 illustrates a more detailed embodiment of the method for reconfiguring data network nodes 3, 5, 7 in a data network 1.

The first and second steps S21 and S22 correspond to steps S11 and S12, respectively, of the method illustrated in FIG. 10.

In a third step S23, a data model 29 modeling the data network nodes 3, 5, 7 of the data network 1 and their possible configurations is stored in the NMS system 9. This data model together with the configuration data in the Running and Candidate databases 25, 27 form data structure representations of the current and desired configurations of the data network nodes 3, 5, 7.

In a fourth step S24, the data model 29 is used to generate, from the first and second data sets $25^I$-$25^V$, $27^I$-$27^V$, text entities T1, T2 describing the current and desired configurations of the data network nodes (3, 5, 7) in plain text, and metadata entities M1, M2 associated with said text entities (T1, T2) and relating the text of the text entities to the data model 29.

In a fifth step S25, the text entities T1, T2 are compared with each other, and the metadata entities M1, M2 are compared with each other.

In a sixth step S26, the information entity $33^I$-$33^V$ (the Diff) representing the difference between the current configuration and the desired configuration is generated based on the comparisons between the text entities T1, T2 and the metadata entities M1, M2 in step S25.

In a seventh and final step S27 corresponding to step S14 of the method illustrated in FIG. 10, the Diff $33^I$-$33^V$ is used to reconfigure at least one of the data network nodes 3, 5, 7 in the data network 1.

Figure 12:
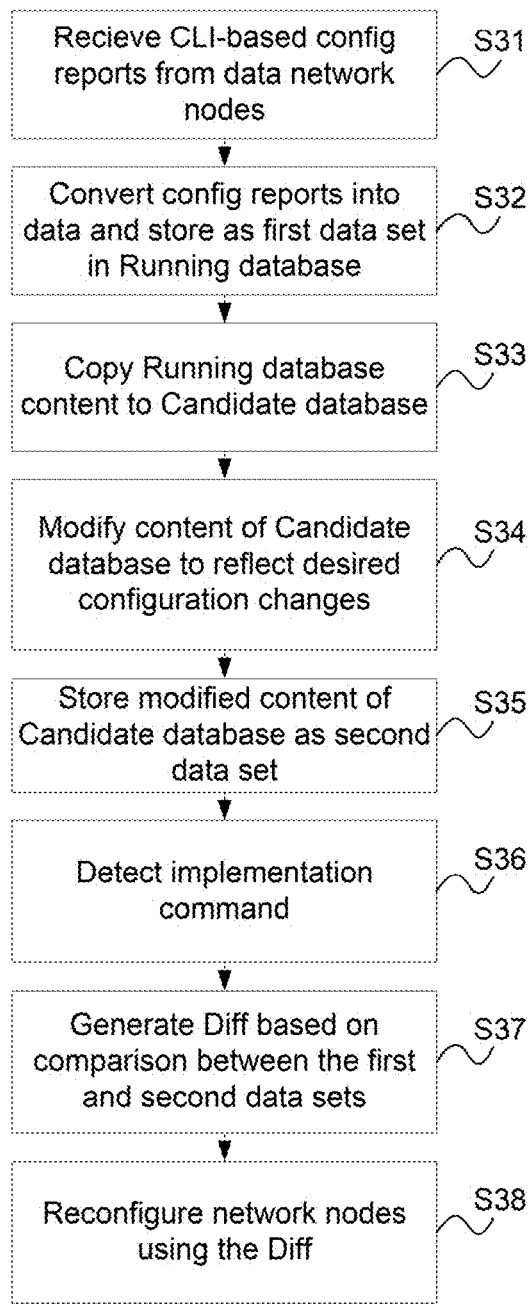

FIG. 12 illustrates yet a more detailed embodiment of the method for reconfiguring data network nodes 3, 5, 7 in a data network 1.

In a first step S31 the NMS system 9 receives configuration reports from the data network nodes 3, 5, 7 via the network interface 19. As mentioned above, the configuration reports are typically text-based reports in form of CLI command sequences and are therefore referred to as CLI configuration reports.

In a second step S32, the controller 13 automatically converts, or translates, the CLI configuration reports into a first set of data $25^I$-$25^V$ that is stored in the Running database 25. In the conversion of the CLI configuration reports into data to be stored in the Running database 25, the controller 13 uses annotations the data model 29 for properly parsing the text into data, as described above.

In a third step S33, the content of the Running database 25 is copied into the Candidate database 27.

In a fourth step S34, the content of the Candidate database 27 is modified to indicate desired changes in configuration of the data network nodes 3, 5, 7. As mentioned above, this step is typically performed manually by one or more network engineers, or automatically or semi-automatically by means of tailor made software. All other steps of the reconfiguration process described herein may be performed automatically by the NMS system 9 according to the invention.

In a fifth step S35, the modified content of the Candidate database 27 is stored.

In a sixth step S36, a command to implement the desired configuration changes in the data network 1, typically given by a network operator 23, is detected.

In a seventh step S37, the controller 13, upon detection of said command to implement the configuration changes, starts the process of generating the Diff 33, $33^I$-$33^V$ representing the difference between the current configuration and the desired configuration. As described above, this process typically involves generation of a first text entity T1 describing the current configuration of the data network nodes 3, 5, 7 in plain text, and a second text entity T2 describing the desired configuration of the data network nodes 3, 5, 7 in plain text. These text entities T1, T2 are generated by the controller 13 using annotations in the data model 29 indicating to the controller 13 how to properly map the data in the Running and Candidate databases 25, 27 into text (CLI command sequences), as also described above. Furthermore, the process involves generation of a first metadata entity M1 associated with said first text entity T1 and relating the text of the first text entity T1 to the data model 29, and a second metadata entity M1 associated with said second text entity T2 and relating the text of the second text entity T2 to the data model 29. It further involves a comparison between first text entity T1 and the second text entity T2, and a comparison between the first metadata entity M1 and the second metadata entity M2. The Diff $33^I$-$33^V$ is then generated by the controller 13 based on the result of these comparisons. In accordance with the examples described above, the comparisons are typically performed on a line-by-line basis, and the Diff is gradually generated during the process of comparison by adding a text line (a CLI command) to the Diff whenever a difference between the text entities T1, T2 or the metadata entities M1, M2 is detected.

In a seventh step S37, the Diff $33^I$-$33^V$ which now contains CLI command sequences is used to reconfigure one or more data network nodes 3, 5, 7. Typically, this is achieved by transmitting the CLI command sequences of the Diff to the data network node or nodes 3, 5, 7, the configurations of which are to be changed.

The invention claimed is:

1. A method for reconfiguring data network nodes in a data network, the method comprising the steps of:
   storing information comprising:
      a first set of data representing a current configuration of the data network nodes, and
      a second set of data representing a desired configuration of the data network nodes;

storing a data model which together with said first and second sets of data provides data structure representations of said current and desired configurations of the data network nodes;
generating, from said first and second sets of data and said data model:
text entities describing said current and desired configurations of the data network nodes in plain text, and
metadata entities associated with said text entities and relating the text of the text entities to said data model;
generating, from said first set of data and said second set of data, an information entity representing a difference between said current configuration and said desired configuration, wherein said data model, said text entities, and said metadata entities are used in the generation of said information entity; and
reconfiguring at least one of said data network nodes using said information entity.

2. The method according to claim 1, comprising the steps of:
generating a first text entity describing the current configuration of the data network nodes in plain text, a second text entity describing the desired configuration of the data network nodes in plain text, a first metadata entity associated with said first text entity and relating the text of the first text entity to the data model, and a second metadata entity associated with said second text entity and relating the text of the second text entity to the data model;
comparing the first text entity with the second text entity;
comparing the first metadata entity with the second metadata entity, and
generating said information entity based on said comparisons.

3. The method according to claim 1, wherein said data model comprises a first set of annotations indicative of how to map data into text in form of CLI command sequences, the method comprising the step of using said first set of annotations to generate said information entity in form of CLI command sequences interpretable by command-line interfaces of said data network nodes.

4. The method according to claim 1, wherein said data model comprises a second set of annotations indicative of how to parse text in form of CLI command sequences into data, the method comprising the steps of:
retrieving text in form of CLI command sequences indicative of the current configuration of the data network nodes;
converting said CLI command sequences into data using said second set of annotations, and
storing the data as said first set of data representing the current configuration of the data network nodes.

5. The method according to claim 1, wherein said information entity is generated in form of CLI command sequences, and wherein the use of said information entity to reconfigure at least one of said data network nodes involves transmission of said CLI command sequences to said at least one data network node.

6. The method according to claim 1, further comprising the steps of:
receiving CLI command sequences indicative of the current configuration of the data network nodes from said data network nodes;
converting the received CLI command sequences to data, and
storing the data as said first set of data representing the current configuration of the data network nodes.

7. A network management system for reconfiguring data network nodes in a data network, the network management system comprising:
storage medium for storing information comprising:
a first set of data representing a current configuration of the data network nodes, and
a second set of data representing a desired configuration of the data network nodes;
storage medium for storing a data model which together with said first and second sets of data provides data structure representations of said current and desired configurations of the data network nodes;
a controller configured to:
generate, from said first and second sets of data and said data model:
text entities describing said current and desired configurations of the data network nodes in plain text, and
metadata entities associated with said text entities and relating the text of the text entities to said data model;
generate, from said first set of data and said second set of data, an information entity representing a difference between said current configuration and said desired configuration;
use said data model, said text entities, and said metadata entities in the generation of said information entity; and
reconfigure at least one of said data network nodes using said information entity.

8. The network management system according to claim 7, said controller being configured to:
generate a first text entity describing the current configuration of the data network nodes in plain text, a second text entity describing the desired configuration of the data network nodes in plain text, a first metadata entity associated with said first text entity and relating the text of the first text entity to the data model, and a second metadata entity associated with said second text entity and relating the text of the second text entity to the data model;
compare the first text entity with the second text entity;
compare the first metadata entity with the second metadata entity, and
generate said information entity based on said comparisons.

9. The network management system according to claim 7, wherein said data model comprises a first set of annotations indicative of how to map data into text in form of CLI command sequences, the controller being configured to use said first set of annotations to generate said information entity in form of CLI command sequences interpretable by command-line interfaces of said data network nodes.

10. The network management system according to claim 7, wherein said data model comprises a second set of annotations indicative of how to parse text in form of CLI command sequences into data, the controller being configured to:
retrieve text in form of CLI command sequences indicative of the current configuration of the data network nodes;
convert said CLI command sequences into data using said second set of annotations, and
store the data as said first set of data representing the current configuration of the data network nodes.

11. The network management system according to claim 7, said controller being configured to generate said information entity in form of CLI command sequences, and to use said information entity to reconfigure at least one of said data network nodes by transmitting said CLI command sequences to said at least one data network node.

12. The network management system according to claim 7, said system further comprising a network interface for receiving CLI command sequences indicative of the current configuration of the data network nodes from said data network nodes, the controller being configured to:
   convert the received CLI command sequences to data, and store the data as said first set of data representing the current configuration of the data network nodes.

13. A non-transitory computer-readable storage medium comprising computer-executable instructions for reconfiguring data network nodes in a data network, the computer-executable instructions comprising instructions for:
   storing information comprising:
      a first set of data representing a current configuration of the data network nodes, and
      a second set of data representing a desired configuration of the data network nodes;
   storing a data model which together with said first and second sets of data provides data structure representations of said current and desired configurations of the data network nodes,
   generating, from said first and second sets of data and said data model:
      text entities describing said current and desired configurations of the data network nodes in plain text, and
      metadata entities associated with said text entities and relating the text of the text entities to said data model;
   generating, from said first set of data and said second set of data, an information entity representing a difference between said current configuration and said desired configuration, wherein said data model, said text entities, and said metadata entities are used in the generation of said information entity; and
   reconfiguring at least one of said data network nodes using said information entity.

* * * * *